United States Patent
Yun

(10) Patent No.: US 11,347,122 B2
(45) Date of Patent: May 31, 2022

(54) DISPLAY APPARATUS

(71) Applicant: Samsung Display Co., Ltd., Yongin-Si (KR)

(72) Inventor: Huigyeong Yun, Hwaseong-si (KR)

(73) Assignee: Samsung Display Co., Ltd.

( * ) Notice: Subject to any disclaimer, the term of this patent is extended or adjusted under 35 U.S.C. 154(b) by 0 days.

(21) Appl. No.: 17/070,994

(22) Filed: Oct. 15, 2020

(65) Prior Publication Data
US 2021/0263383 A1    Aug. 26, 2021

(30) Foreign Application Priority Data

Feb. 21, 2020  (KR) .......................... 10-2020-0021500

(51) Int. Cl.
*G02F 1/1362* (2006.01)
*G02F 1/1343* (2006.01)
*G02F 1/1368* (2006.01)

(52) U.S. Cl.
CPC ...... *G02F 1/136286* (2013.01); *G02F 1/1368* (2013.01); *G02F 1/134309* (2013.01); *G02F 1/136213* (2013.01); *G02F 1/136218* (2021.01); *G02F 2201/123* (2013.01)

(58) Field of Classification Search
CPC .............................................. G02F 1/136286
See application file for complete search history.

(56) References Cited

U.S. PATENT DOCUMENTS

| | | | |
|---|---|---|---|
| 6,323,918 B1 * | 11/2001 | Yoshioka | G02F 1/136209 349/48 |
| 9,417,498 B2 | 8/2016 | Paek et al. | |
| 9,488,888 B2 | 11/2016 | Lee et al. | |
| 2010/0079419 A1 * | 4/2010 | Shibusawa | H01L 27/3272 345/204 |
| 2011/0187685 A1 * | 8/2011 | Kwon | H01L 27/1255 345/206 |
| 2012/0099067 A1 * | 4/2012 | Hara | H04N 9/3105 349/139 |

(Continued)

FOREIGN PATENT DOCUMENTS

| KR | 10-2015-0058609 A | 5/2015 |
|---|---|---|
| KR | 10-2016-0086524 A | 7/2016 |

(Continued)

*Primary Examiner* — Sang V Nguyen
(74) *Attorney, Agent, or Firm* — Innovation Counsel LLP

(57) ABSTRACT

Provided is a display apparatus including a first substrate, a second substrate, and a liquid crystal layer. The first substrate includes a gate line, a data line, a storage electrode, and a switching element. The switching element is connected to a data line and a gate line. The first substrate further includes a pixel electrode, a shielding electrode, and first and second capacitor electrodes. The pixel electrode is connected to an output electrode of the switching element, and the shielding electrode includes a line portion disposed along the data line and an extension portion extended from the line portion. The first capacitor electrode is extended from the output electrode and overlaps the pixel electrode and the storage electrode. The second capacitor electrode is disposed spaced apart from the first capacitor electrode and overlaps the extension portion electrode the shielding electrode and the storage electrode.

20 Claims, 11 Drawing Sheets

(56) References Cited

U.S. PATENT DOCUMENTS

| | | | |
|---|---|---|---|
| 2012/0326950 A1* | 12/2012 | Park | G09G 3/3607 |
| | | | 345/55 |
| 2015/0060814 A1* | 3/2015 | Noh | H01L 27/1255 |
| | | | 257/40 |
| 2016/0202582 A1* | 7/2016 | Paek | G02F 1/136209 |
| | | | 349/43 |
| 2017/0031219 A1* | 2/2017 | Lin | G09G 3/3648 |
| 2017/0343860 A1* | 11/2017 | Park | G02F 1/133512 |
| 2019/0011742 A1 | 1/2019 | Park et al. | |
| 2019/0121205 A1 | 4/2019 | Lazo Martinez et al. | |
| 2019/0196238 A1* | 6/2019 | Heo | H01L 27/1255 |

FOREIGN PATENT DOCUMENTS

| | | |
|---|---|---|
| KR | 10-2019-0005277 A | 1/2019 |
| KR | 10-2019-0044717 A | 5/2019 |
| KR | 10-2019-0076705 A | 7/2019 |

* cited by examiner

DISPLAY APPARATUS

CROSS-REFERENCE TO RELATED APPLICATIONS

This U.S. non-provisional patent application claims priority under 35 U.S.C. § 119 of Korean Patent Application No. 10-2020-0021500, filed on Feb. 21, 2020, the entire contents of which are hereby incorporated by reference.

BACKGROUND

1. Filed

The present disclosure herein relates to a display apparatus. More particularly, the present disclosure relates to a display apparatus operating in a vertically aligned mode to improve transmittance and display quality.

2. Description of the Related Art

A liquid crystal display device includes a liquid crystal display panel including two substrates facing each other and a liquid crystal layer disposed between the substrates. The liquid crystal display device supplies a voltage to an electric field generating electrode to apply an electric field to the liquid crystal layer. Accordingly, an alignment direction of liquid crystal molecules of the liquid crystal layer is determined and an image is displayed by controlling the polarization of an incident light.

Among liquid crystal display devices, a liquid crystal display device of a vertically aligned mode in which the long axes of liquid crystal molecules are arranged to be perpendicular to two substrates in a state in which an electric field is not applied has a large contrast ratio and is capable of easily implementing a wide reference viewing angle.

In order to improve the viewing angle characteristic of a liquid crystal display device, techniques for dividing and controlling a pixel region into a plurality of domains have been developed, and examples of such techniques include a charge share (CS) method and a resistivity division (RD) method.

However, when the CS method or the RD method is employed, a large number of transistors and a large number of capacitors are required, so that there is a problem in that the transmittance of a liquid crystal display panel is reduced.

SUMMARY

The present disclosure provides a display apparatus having improved transmittance and display quality.

An embodiment of the present disclosure provides a display apparatus comprising a first substrate, a second substrate facing the first substrate, and a liquid crystal layer disposed between the first substrate and the second substrate.

The first substrate includes a gate line, a data line insulated from the gate line, a storage electrode insulated from the gate line and the data line respectively, a switching element electrically connected to the data line and the gate line, a pixel electrode electrically connected to an output electrode of the switching element, and a shielding electrode insulated from the pixel electrode and having a line portion disposed in aligned with the data line and an extension portion extended from the line portion. The first substrate further includes first and second capacitor electrodes. The first capacitor electrode is extended from the output electrode and overlaps the pixel electrode and the storage electrode. The second capacitor electrode is disposed spaced apart from the first capacitor electrode and overlaps the extension portion electrode the shielding electrode and the storage electrode.

In an embodiment, the second capacitor electrode may be in direct contact with the extension portion of the shielding electrode.

In an embodiment, the first capacitor electrode may be in direct contact with the pixel electrode.

In an embodiment, an area of the second capacitor electrode may be greater than an area of the first capacitor electrode.

In an embodiment, the first substrate may further include a first insulation layer disposed on the gate line and the storage electrode and having the output electrode, the data line, and the first and second capacitor electrodes disposed on the gate line and the storage electrode and a second insulation layer disposed on the output electrode, the data line, and the first and second capacitor electrodes and having the pixel electrode and the shielding electrode disposed on the output electrode, the data line, and the first and second capacitor electrodes.

In an embodiment, the second insulation layer may include a first contact hole configured to expose the first capacitor electrode and a second contact hole configured to expose the second capacitor electrode, the pixel electrode may be in direct contact with the first capacitor electrode through the first contact hole, and the extension portion of the shielding electrode may be in direct contact with the second capacitor electrode through the second contact hole.

In an embodiment, the second substrate may include a reference electrode to which a first reference voltage is applied, and a second reference voltage may be applied to the shielding electrode.

In an embodiment, a storage voltage may be applied to the storage electrode, and the first and second reference voltages may have a different voltage level from the storage voltage.

In an embodiment, the first and second reference voltages may have equal voltage level.

In an embodiment, the first substrate may further include a storage line insulated from the gate line and the data line respectively, and the storage line may be connected to the storage electrode.

In an embodiment of the present disclosure, a display apparatus includes a gate line, a data line insulated from the gate line, a storage line insulated from the gate line and the data line, and a pixel connected to the gate line, the data line, and the storage line.

In an embodiment, the pixel may include a switching element electrically connected to the gate line and the data line, a liquid crystal capacitor electrically connected to an output electrode of the switching element, a first storage capacitor electrically connected to the liquid crystal capacitor and the storage line, and a second storage capacitor electrically connected to the storage line and the shielding electrode.

In an embodiment, the liquid crystal capacitor may include a pixel electrode electrically connected to the output electrode of the switching element as a first electrode and a reference electrode facing the pixel electrode as a second electrode.

In an embodiment, the first storage capacitor may include a storage electrode electrically connected to the storage line as a first electrode and a first capacitor electrode overlapping the storage electrode and extended from the output electrode as a second electrode.

In an embodiment the second storage capacitor may include the storage electrode as a first electrode and a second capacitor electrode overlapping the storage electrode and being in direct contact with the shielding electrode as a second electrode.

In an embodiment, the storage electrode may receive a storage voltage through the storage line, the reference electrode may receive a first reference voltage having a different voltage level from the storage voltage, and the shielding electrode may receive a second reference voltage having a different voltage level from the storage voltage.

In an embodiment, the first and second reference voltages may have equal voltage level.

In an embodiment, a capacitance of the second storage capacitor may be greater than a capacitance of the first storage capacitor.

BRIEF DESCRIPTION OF THE FIGURES

The accompanying drawings are included to provide a further understanding of the present disclosure, and are incorporated in and constitute a part of this specification. The drawings illustrate example embodiments of the present disclosure and, together with the description, serve to explain principles of the present disclosure. In the drawings.

DETAILED DESCRIPTION

Figure 1:
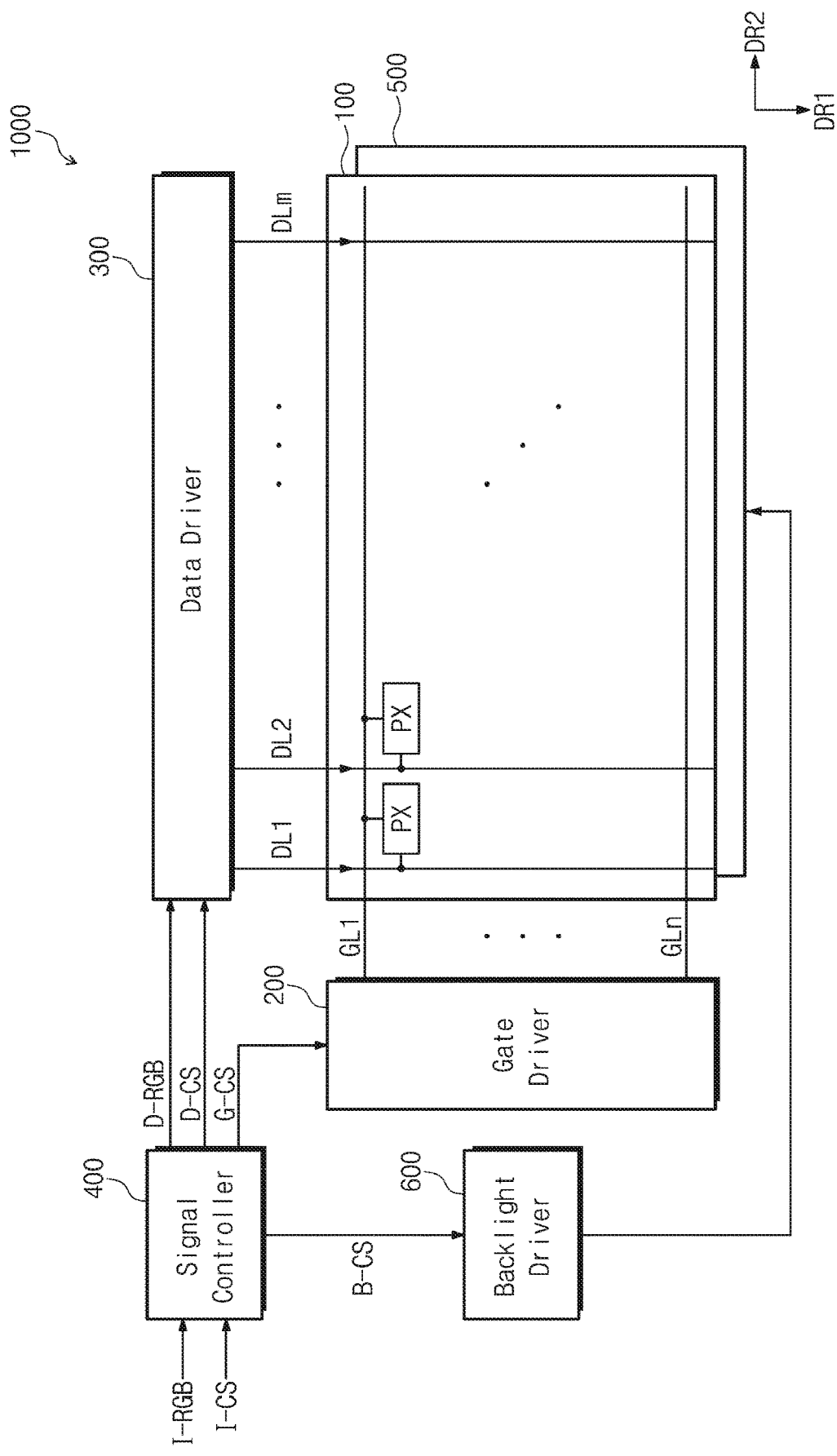
FIG. 1 is a block diagram of a display apparatus according to an embodiment of the present disclosure.

In the present disclosure, when an element (or a region, a layer, a portion, and the like) is referred to as being "on," "connected to," or "coupled to" another element, it means that the element may be directly disposed on/connected to/coupled to the other element, or that a third element may be disposed therebetween.

Like reference numerals refer to like elements. Also, in the drawings, the thickness, the ratio, and the dimensions of elements are exaggerated for an effective description of technical contents.

The term "and/or," includes all combinations of one or more of which associated configurations may define.

It will be understood that, although the terms "first", "second", etc. may be used herein to describe various elements, these elements should not be limited by these terms. These terms are only used to distinguish one element from another. For example, a first element could be termed a second element, and, similarly, a second element could be termed a first element, without departing from the scope of example embodiments of the present disclosure. The terms of a singular form may include plural forms unless the context clearly indicates otherwise.

In addition, terms such as "below," "lower," "above," "upper," and the like are used to describe the relationship of the configurations shown in the drawings. The terms are used as a relative concept and are described with reference to the direction indicated in the drawings.

It should be understood that the terms "comprise", or "have" are intended to specify the presence of stated features, integers, steps, operations, elements, components, or combinations thereof in the disclosure, but do not preclude the presence or addition of one or more other features, integers, steps, operations, elements, components, or combinations thereof.

Hereinafter, exemplary embodiments of the present disclosure will be described with reference to the accompanying drawings.

Figure 2:
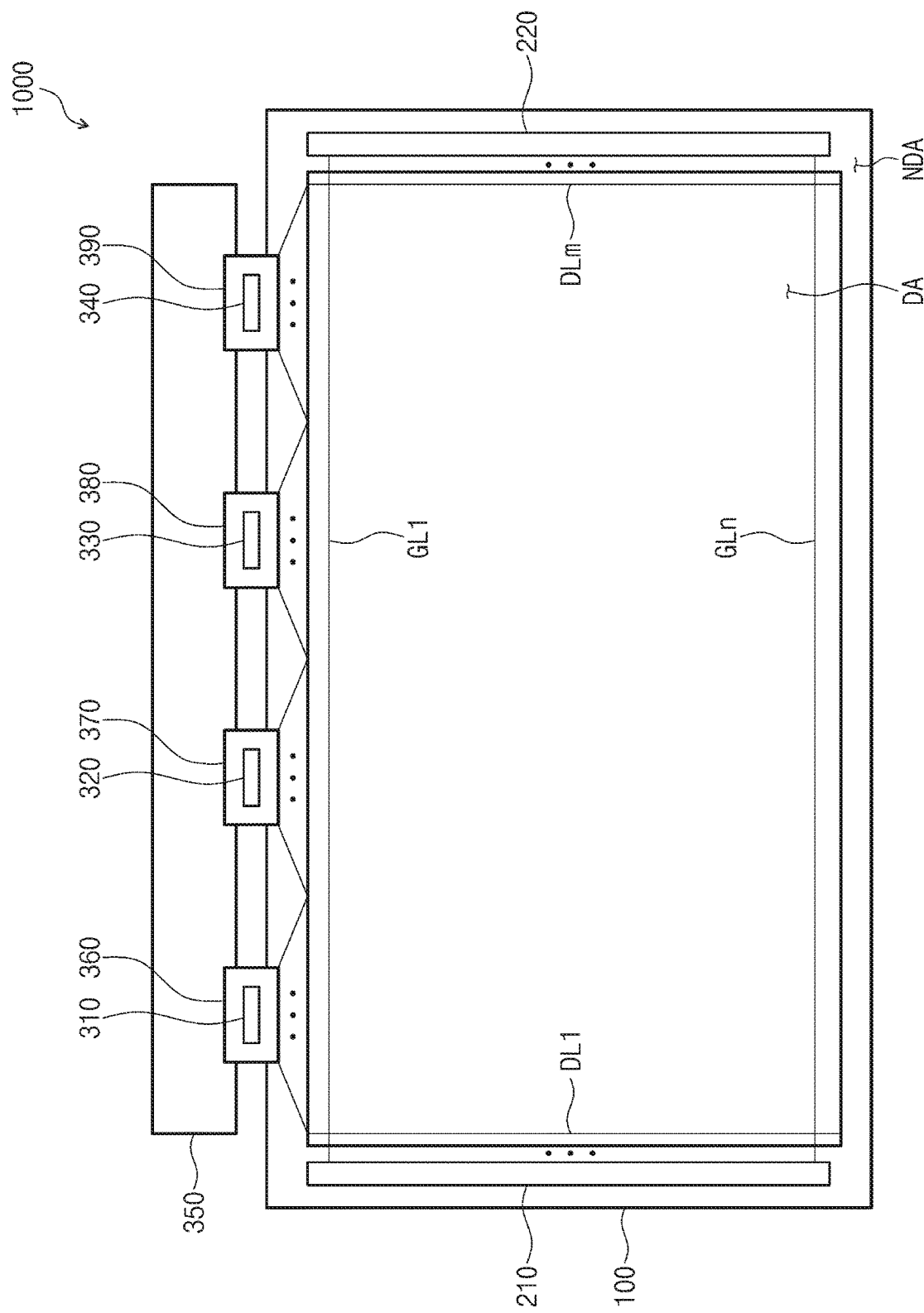
FIG. 2 is a plan view of a display apparatus according to an embodiment of the present disclosure.

FIG. 1 is a block diagram of a display apparatus according to an embodiment of the present disclosure, and FIG. 2 is a plan view of a display apparatus according to an example of the present disclosure.

Referring to FIG. 1, a display apparatus 1000 according to an embodiment of the present disclosure includes a display panel 100 for displaying an image, panel drivers 200, 300, and 400 for driving the display panel 100, a backlight unit 500 for supplying light to the display panel 100, and a backlight driver 600 for driving the backlight unit 500. In an embodiment of the present disclosure, the panel drivers 200, 300, and 400 may include a gate driver 200, a data driver 300, and a signal controller 400.

The display panel 100 includes a plurality of gate lines from GL1 to GLn, a plurality of data lines from DL1 to DLm, and a plurality of pixels PX. The plurality of gate lines from GL1 to GLn is arranged in parallel to each other in a first direction DR1. The plurality of gate lines from GL1 to GLn may be extended in a second direction DR2 crossing the first direction DR1. In an embodiment of the present disclosure, the second direction DR2 may be perpendicular to the first direction DR1. The plurality of data line from DL1 to DLm is arranged in parallel in the second direction DR2, and may be extended in the first direction DR1. The plurality of pixels PX are arranged in a matrix form, and each of the plurality of pixels PX may be electrically connected to one of the plurality of gate lines from GL1 to GLn and one of the plurality of data lines from DL1 to DLm.

The signal controller 400 receives an input image signal I-RGB and a plurality of control signals I-CS from an external source (not shown) outside of the display apparatus 1000. The signal controller 400 renders the input image signals I-RGB to meet interface specifications with the data driver 300 so as to convert the same into output image signals D-RGB. The signal controller 400 provides the output image signals D-RGB to the data driver 300. Also, the signal controller 400 generates a data control signal D-CS (for example, an output start signal, and the like.) and a gate control signal G-CS (for example, a scan start signal, a clock signal, and a clock bar signal) based on the plurality of control signals I-CS. The signal controller 400 provides the data control signal D-CS to the data driver 300 and provides the gate control signal G-CS to the gate driver 200.

The gate driver 200 sequentially outputs a gate signal in response to the gate control signal G-CS provided from the signal controller 400. Accordingly, the plurality of pixels PX may be sequentially scanned by the gate signal row by row.

The data driver 300 converts the output image signals D-RGB into data voltages in response to the data control signal D-CS provided from the signal controller 400. The data driver 300 applies the data voltages to the data lines from DL1 to DLm of the display panel 100.

Accordingly, each of the plurality of pixels PX is turned on by the gate signal, and the turned-on pixel PX receives a corresponding data voltage from the data driver 300 and displays an image of a desired gray scale.

As shown in FIG. 1, the backlight unit 500 is located on a rear surface of the display panel 100 and supplies light from the rear of the display panel 100. The backlight driver 600 receives a light source control signals B-CS from the signal controller 400 and drives the backlight unit 500 in synchronization with the display panel 100.

Referring to FIG. 2, in the display apparatus 1000 according to an embodiment of the present disclosure, the gate driver 200 (refer to FIG. 1) includes a first gate driving circuit 210 and a second gate driving circuit 220. The first gate driving circuit 210 is connected to a first end of the gate lines from GL1 to GLn, and the second gate driving circuit 220 is connected to a second end of the gate lines from GL1 to GLn.

Each of the first and second gate driving circuits 210 and 220 may include a shift register which sequentially outputs a gate signal. The first and second gate driving circuits 210 and 220 may operate simultaneously to output a gate signal to equal gate line simultaneously. Accordingly, each gate line from GL1 to GLn may receive a gate signal from the first and second gate driving circuits 210 and 220 through the first and second end portions.

The data driver 300 (refer to FIG. 1) may include a plurality of data integrated circuits 310, 320, 330, and 340. Although FIG. 2 illustrates a structure in which the data driver 300 includes four data integrated circuits 310, 320, 330, and 340, the embodiment of the present disclosure is not limited. That is, the number of data integrated circuits included in the data driver 300 is not particularly limited.

According to an embodiment, the display apparatus 1000 may include flexible circuit boards 360, 370, 380, and 390 on which each of the data integrated circuits 310, 320, 330, and 340 is mounted and a printed circuit board 350 electrically connected to the flexible circuit boards 360, 370, 380, and 390.

The flexible circuit boards 360, 370, 380, and 390 electrically connect the display panel 100 to the printed circuit board 350. Specifically, one end of each of the flexible circuit boards 360, 370, 380, and 390 may be coupled to the printed circuit board 350, and the other end of each of the flexible circuit boards 360 to 390 may be coupled to the display panel 100.

As depicted in FIG. 2, the display panel 100 includes a display region DA for displaying an image and a non-display region NDA adjacent to the display region DA. The display region DA is a region in which an image is substantially displayed, and the non-display region NDA is a bezel region in which an image is not displayed. FIG. 2 illustrates a structure in which the non-display region NDA is disposed to surround the display region NDA, but the embodiment of the present disclosure is not limited. The non-display region NDA may be disposed on at least one side of the display region DA. In an embodiment of the present disclosure, the flexible circuit boards 360, 370, 380, and 390 may be connected to the non-display region NDA of the display panel 100 adjacent to the printed circuit board 350.

FIG. 2 illustrates a structure in which the data integrated circuits 310, 320, 330, and 340 are respectively disposed on the flexible circuit boards 360, 370, 380 and 390, but the embodiment of the present disclosure is not limited. That is, the data integrated circuits 310, 320, 330, and 340 may be directly mounted on the non-display region NDA of the display panel 100 in a chip on glass (COG) manner.

Figure 3:
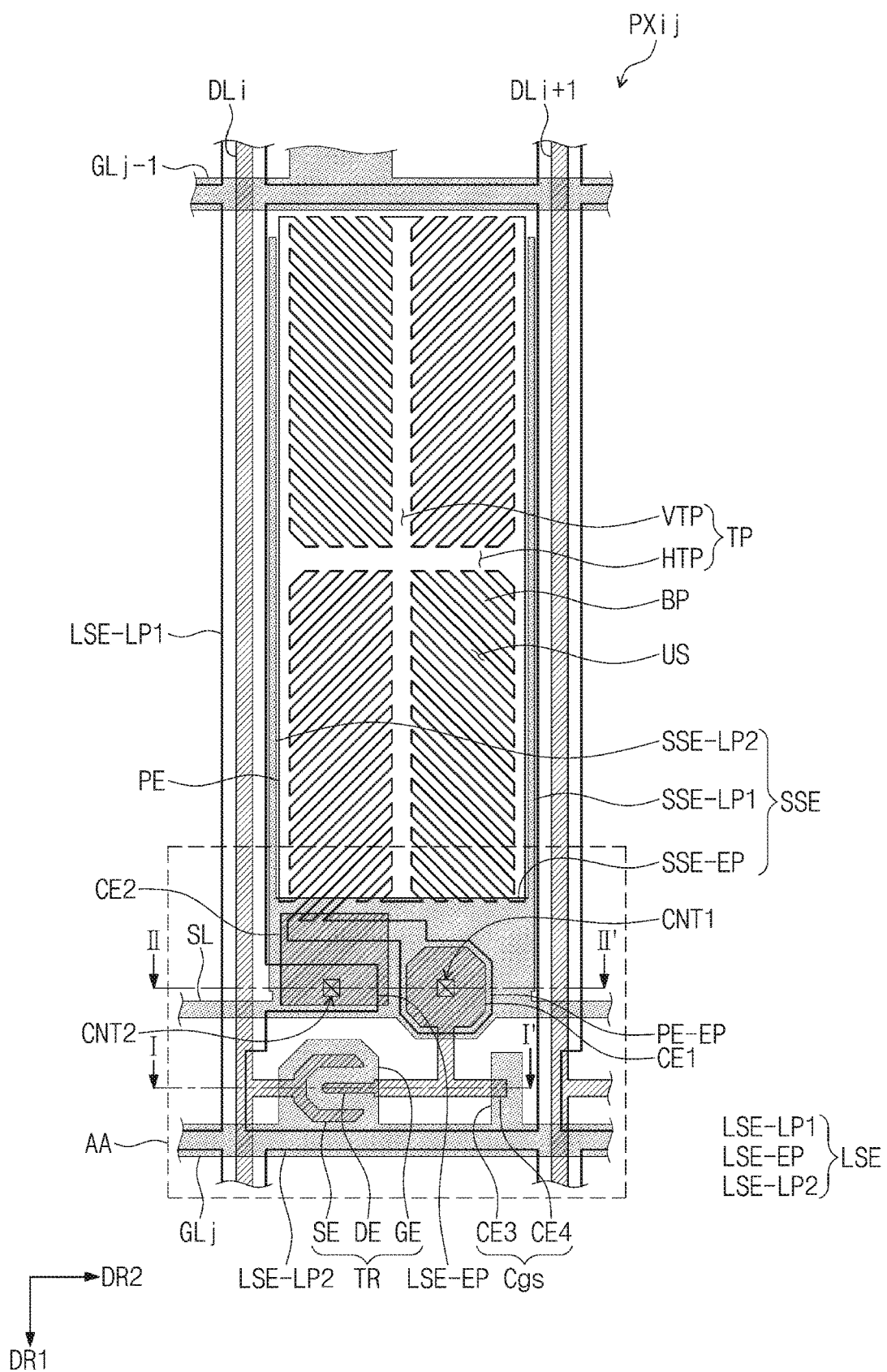
FIG. 3 is a plan view showing a layout of pixels according to an embodiment of the present disclosure.
Figure 4:
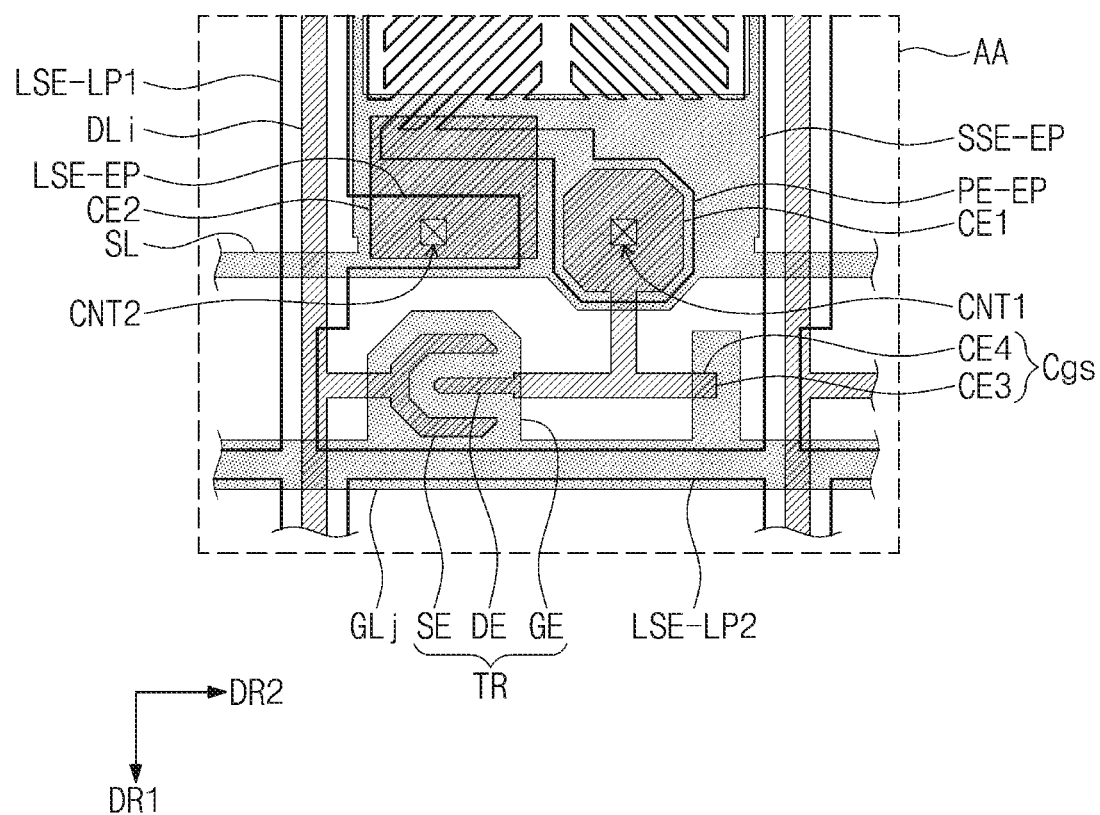
FIG. 4 is an enlarged view of AA region illustrated in FIG. 3.
Figure 5A:
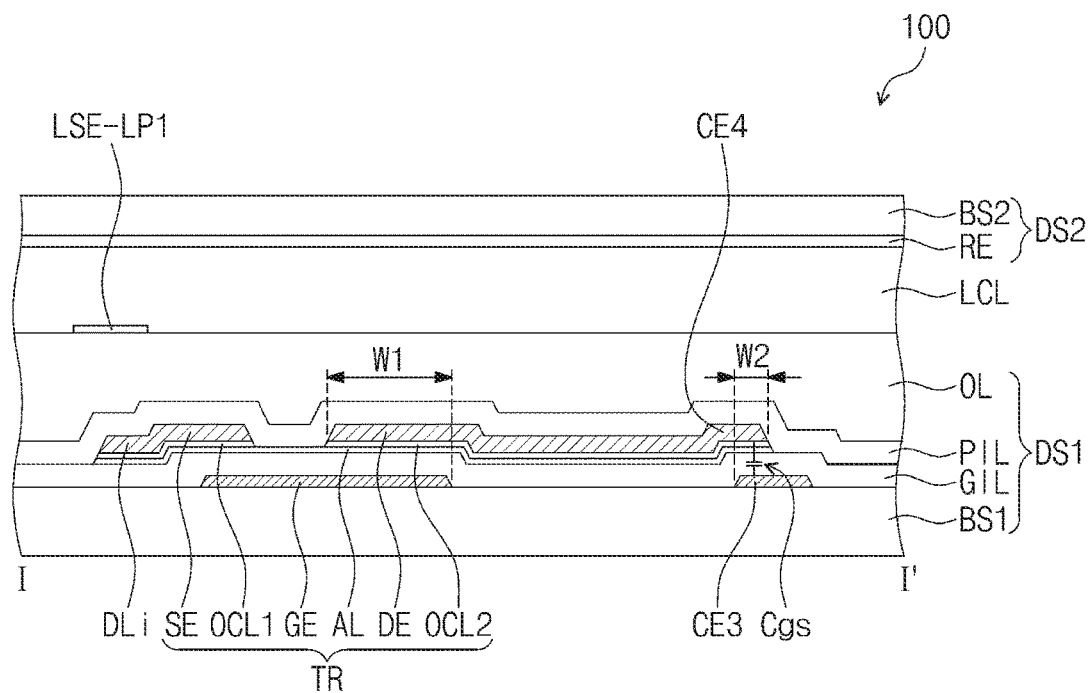
FIG. 5A is a cross-sectional view taken along line I-I' illustrated in FIG. 3.
Figure 5B:
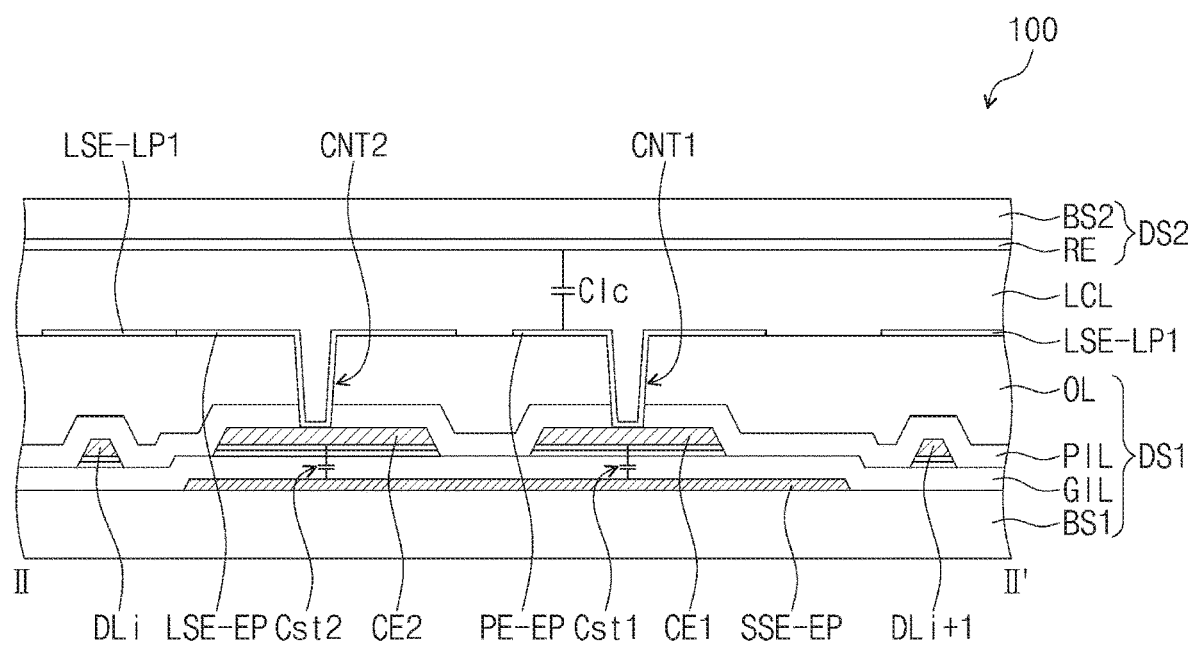
FIG. 5B is a cross-sectional view taken along line II-II' illustrated in FIG. 3.

FIG. 3 is a plan view showing a layout of pixels according to an embodiment of the present disclosure, and FIG. 4 is an enlarged view of AA region illustrated in FIG. 3. FIG. 5A is a cross-sectional view taken along line I-I' illustrated in FIG. 3, and FIG. 5B is a cross-sectional view taken along line II-II' illustrated in FIG. 3.

Since each of the plurality of pixels PX illustrated in FIG. 1 has a substantially similar structure, FIG. 3 illustrates only one pixel PXij among the plurality of pixels PX for convenience of description. Hereinafter, the pixel PXij will be described with reference to the drawings, and descriptions of the rest of the pixels will be omitted.

Referring to FIG. 3 and FIG. 4, the pixel PXij is connected to an i-th data line DLi among the data lines from DL1 to DLm (illustrated in FIG. 1) and connected to a j-th gate line GLj among the gate lines from GL1 to GLn (illustrated in FIG. 1). An i+1-th data line DLi+1 is disposed to be adjacent to the i-th data line DLi in the second direction DR2, and a j−1-th gate line GLj−1 is disposed to be adjacent to the j-th gate line GLj in the first direction DL1. As illustrated in FIG. 3, the i-th data line DLi, the i+1-th data line DLi+1, the j-th gate line GLj, and the j−1-th gate line GLj−1 intersect each other to define a pixel region having a quadrangular shape. The pixel PXij may be disposed in correspondence to the pixel region. The shape of the pixel region is not limited, and the pixel region may have various shapes such as a rhombic shape, a hexagonal shape, and a circular shape in addition to a quadrangular shape.

The pixel PXij includes a switching element TR, a pixel electrode PE, a storage electrode SSE, a shielding electrode LSE, and first and second capacitor electrodes CE1 and CE2.

The switching element TR is electrically connected to the i-th data line DLi and the j-th gate line GLj. In an embodiment of the present disclosure, the switching element TR may include a thin film transistor. The switching element TR may include a control electrode GE, an input electrode SE, and an output electrode DE. The control electrode GE is branched from the j-th gate line GLj along the first direction DR1, and the input electrode SE is branched from the i-th data line DLi along the second direction DR2. The output electrode DE may be disposed to be spaced apart from the input electrode SE on an upper portion of the control electrode GE.

The storage electrode SSE may be spaced apart from the data lines DLi and DLi+1 and the gate lines GLj and GLj−1 and disposed in the pixel region. In an embodiment of the present disclosure, the storage electrode SSE may include an electrode portion SSE-EP and two line portions SSE-LP1 and SSE-LP2. The two line portions SSE-LP1 and SSE-LP2 extend along the data lines DLi and DLi+1 from one side of the electrode portion SSE-EP. The two line portions SSE-LP1 and SSE-LP2 may be disposed to be spaced apart with respect to the pixel electrode PE.

However, the shape of the storage electrode SSE is not limited. For example, the two line portions SSE-LP in the storage electrode SSE may be omitted.

The storage electrode SSE may be connected to an adjacent storage electrode on the second direction DR2 through a storage line SL. The storage line SL may have an integral shape with the storage electrode SSE. However, the embodiment of the present disclosure is not limited. That is, the storage line SL and the storage electrode SSE may be disposed on different layers and be into contact with each other through a contact hole. The storage line SL may be disposed in parallel with the gate lines GLj and GLj−1 and may cross the data lines DLi and DLi+1 while the storage line SL is insulated from the data lines DLi and DLi+1. The storage line SL may receive a storage voltage Vst (illustrated in FIG. 8) from an external source and supply the same to the storage voltage SSE. The storage line SL crosses the data lines DLi and DLi+1 but does not cross the gate lines GLj and GLj−1.

The pixel electrode PE is electrically connected to the output electrode DE of the switching element TR. Accordingly, when the switching element TR is turned on in response to a gate signal applied from the j-th gate line GLj, the switching element TR may output a data voltage applied from the i-th data line DLi to the output electrode DE. A voltage output through the output electrode DE is applied to the pixel electrode PE. Here, a voltage applied to the pixel electrode PE may be defined as a pixel voltage Vp (illustrated in FIG. 10B).

The pixel electrode PE includes a stem portion TP for dividing the pixel region into a plurality of domains and a plurality of branch portions BP radially extended from the stem portion TP. The stem portion TP may include a vertical stem portion VTP extended in the first direction DR1 and a horizontal stem portion HTP extended in the second direction DR2. The stem portion TP is provided in a cross shape by the vertical stem portion VTP and the horizontal stem portion HTP, and in this case, the pixel region may be partitioned into 4 domains.

The plurality of branch portions BP are extended in parallel to each other in each domain partitioned by the stem portion TP and are arranged to be spaced apart from each other. In an embodiment of the present disclosure, the branch portions BP may be extended in a direction at approximately 45° with respect to the stem portion TP. As for the branch portions BP, two branch portions BP adjacent to each other are spaced apart by a distance of about a micrometer to form a plurality of fine slits US. Liquid crystal molecules of the liquid crystal layer LCL (illustrated in FIG. 5A) may be pre-tilted in different directions domain by domain by the plurality of fine slits US.

The shielding electrode LSE includes a vertical line portion LSE-LP1 disposed along the data lines DLi and DLi+1 and an extension portion LSE-EP extended from the vertical line portion LSE-LP1. When viewed on a plan, the vertical line portion LSE-LP1 of the shielding electrode LSE may overlap the data lines DLi and DLi+1. The shielding electrode LSE may further include a horizontal line portion LSE-LP2 disposed along the gate lines GLj and GLj−1. When viewed on a plan, the horizontal line portion LSE-LP2 of the shielding electrode LSE may overlap the gate lines GLj and GLj−1. The shielding electrode LSE may be electrically insulated from the gate lines GLj and GLj−1 and the data lines DLi and DLi+1. Also, the shielding electrode LSE is disposed spaced apart from the pixel electrode PE viewed on a plan to be electrically insulated from the pixel electrode PE. That is, the shielding electrode LSE does not overlap the pixel electrode PE when viewed on a plan.

A first capacitor electrode CE1 is extended from the output electrode DE of the switching element TR along first direction DR1 and overlaps the storage electrode SSE and the pixel electrode PE. The first capacitor electrode CE1 may be formed in an integral shape with the output electrode DE of the switching element TR. The first capacitor electrode CE1 may be in direct contact with an extension portion PE-EP of the pixel electrode PE through a first contact hole CNT1. The extension portion PE-EP of the pixel electrode PE may overlap the first capacitor electrode CE1 and the electrode portion SSE-EP of the storage electrode SSE. In addition, the first capacitor electrode CE1 may face the electrode portion SSE-EP of the storage electrode SSE with an insulation layer which is disposed between the first capacitor electrode CE1 and the electrode portion SSE-EP of the storage electrode SSE. Accordingly, a first storage capacitor Cst1 (illustrated in FIG. 5B) may be defined between the first capacitor electrode CE1 and the electrode portion SSE-EP of the storage electrode SSE.

A second capacitor electrode CE2 may be disposed spaced apart from the first capacitor electrode CE1 and may overlap the shielding electrode LSE and the storage electrode SSE. The second capacitor electrode CE2 may overlap the extension portion LSE-EP of the shielding electrode LSE and may be in direct contact with the extension portion LSE-EP of the shielding electrode LSE through a second contact hole CNT2. In addition, the second capacitor electrode CE2 may face the electrode portion SSE-EP of the storage electrode SSE with an insulation layer which is disposed between the second capacitor electrode CE2 and the electrode portion SSE-EP of the storage electrode SSE. Accordingly, a second storage capacitor Cst2 (illustrated in FIG. 5B) may be defined between the second capacitor electrode CE2 and the electrode portion SSE-EP of the storage electrode SSE.

FIG. 3 and FIG. 4 illustrate the second capacitor electrode CE2 having a quadrangular shape when viewed on a plan, but the shape of the second capacitor electrode CE2 is not limited. In particular, other shapes of the second capacitor electrode CE2 will be described in detail with reference to FIGS. 6A, 6B, and.

The pixel PXij may further include a third capacitor electrode CE3 extended from the j-th gate line GLj and a fourth capacitor electrode CE4 extended from the output electrode DE. The third capacitor electrode CE3 may be extended from the j-th gate line GLj in the first direction DR1 and be disposed in parallel to the control electrode GE. The direction in which the output electrode DE is extended on the control electrode GE may be equal to the direction in which the fourth capacitor electrode CE4 is extended. The third and fourth capacitor electrodes CE3 and CE4 may face each other with an insulation layer which is disposed between the third and fourth capacitor electrodes CE3 and CE4. Accordingly, a compensation capacitor Cgs may be defined by the third and fourth capacitor electrodes CE3 and CE4.

Referring to FIG. 3, FIG. 5A and FIG. 5B, a display panel 100 according to an embodiment of the present disclosure includes a first substrate DS1, a second substrate DS2 facing the first substrate DS1, and a liquid crystal layer LCL interposed between the first substrate DS1 and the second substrate DS2.

The first substrate DS1 includes a first base substrate BS1, the gate lines GLj and GLj−1, the data lines DLi and DLi+1, the switching element TR, a first insulation layer GIL, a second insulation layer PIL, a third insulation layer OL, and the pixel electrode PE.

The first base substrate BS1 may be formed of a glass substrate, or a plastic substrate having light transmission properties and flexible properties. On one surface of the first base substrate BS1, the gate lines GLj and GLj−1, the control electrode GE, the storage electrode SSE, and the third capacitor electrode CE3 are disposed. Here, the gate lines GLj and GLj−1, the control electrode GE, the storage electrode SSE, and the third capacitor electrode CE3 may be referred to as a first metal layer. The first metal layer may be formed of a first metal material. In an embodiment of the present disclosure, the first metal material may include a metal such as aluminum (Al), silver (Ag), copper (Cu), molybdenum (Mo), chrome (Cr), tantalum (Ta), and titanium (Ti), or an alloy of the above. In FIG. 5A and FIG. 5B, the first metal layer has a single-layered structure, but the embodiment of the present disclosure is not limited. That is, the first metal layer may include a multi-layered structure, for example, a titanium layer and a copper layer.

On one surface of the first base substrate BS1, the first insulation layer GIL for covering the first metal layer is disposed. The first insulation layer GIL may include at least one of an inorganic matter and an organic matter. The inorganic material may be, for example, any one of silicon nitride or silicon oxide. The first insulating layer GIL may have a multi-layered structure in which a plurality of inorganic matter layers is sequentially laminated. The plurality of inorganic matter layers may be made of different inorganic matters.

On the first insulation layer GIL, the data lines DLi and DLi+1, the input electrode SE, the output electrode DE, the first and second capacitor electrodes CE1 and CE2, and the fourth capacitor electrode CE4 are disposed. Here, the data lines DLi and DLi+1, the input electrode SE, the output electrode DE, the first and second capacitor electrodes CE1 and CE2, and the fourth capacitor electrode CE4 may be referred to as a second metal layer. The second metal layer may be formed of a second metal material. The second metal material may be equal to the first metal material, or may include different materials.

On the first insulation layer GIL, an active layer of the switching element TR may be further disposed. The active layers may include a semiconductor layer AL and ohmic contact layers OCL1 and OCL2. The semiconductor layer AL may include any one of an amorphous silicon semiconductor, a polysilicon semiconductor, or a metal oxide semiconductor. The active layer may be interposed between the second metal layer and the first insulation layer GIL.

On the first insulation layer GIL, a second insulation layer PIL and a third insulation layer OL for covering the second metal layer are sequentially disposed. The second insulation layer PIL may include an inorganic matter, and the third insulation layer OL may include an organic matter. The third insulation layer OL may provide a flat surface.

On the third insulation layer OL, the pixel electrode PE and the shielding electrode LSE are disposed. The pixel electrode PE and the shielding electrode LSE may be disposed spaced apart from each other and electrically insulated. Also, the pixel electrode PE and the shielding electrode LSE may include a transparent electrode material. The pixel electrode PE and the shielding electrode LSE may be formed of the same material and patterned simultaneously.

The pixel electrode PE is electrically connected to the output electrode DE of the switching element TR. Particularly, the first capacitor electrode CE1 extended from the output electrode DE overlaps the extension portion PE-EP of the pixel electrode PE. The first contact hole CNT1 for exposing the first capacitor electrode CE1 is provided to the second and third insulation layers PIL and OL, and the extension portion PE-EP of the pixel electrode PE is in direct contact with the first capacitor electrode CE1 through the first contact hole CNT1. Accordingly, the output electrode DE of the switching element TR may be electrically connected to the pixel electrode PE through the first capacitor electrode CE1.

The first capacitor electrode CE1 may overlap the electrode portion SSE-EP of the storage electrode SSE with respect to the first insulation layer GIL and the active layers AL, OCL1 and OCL2, which are interposed between the first capacitor electrode CE1 and the electrode portion SSE-EP of the storage electrode SSE. Accordingly, a first storage capacitor Cst1 may be defined between the first capacitor electrode CE1 and the electrode portion SSE-EP of the storage electrode SSE.

The shielding electrode LSE is electrically connected to the second capacitor electrode CE2. Particularly, the second capacitor electrode CE2 is disposed spaced apart from the first capacitor electrode CE1 and overlaps the extension portion LSE-EP of the shielding electrode LSE. The second contact hole CNT2 for exposing the first capacitor electrode CE2 is provided to the second and third insulation layers PIL and OL, and the extension portion LSE-EP of shielding electrode LSE is in direct contact with the second capacitor electrode CE2 through the first contact hole CNT2. Accordingly, the second capacitor electrode CE2 may receive a second reference voltage Scom (illustrated in FIG. 8) through the shielding electrode LSE.

The second capacitor electrode CE2 may overlap the electrode portion SSE-EP of the storage electrode SSE with respect to the first insulation layer GIL and the active layers AL, OCL1 and OCL2, which are interposed between the second capacitor electrode CE2 and the electrode portion SSE-EP of the storage electrode SSE. Accordingly, a second storage capacitor Cst2 may be defined between the first capacitor electrode CE2 and the electrode portion SSE-EP of the storage electrode SSE.

In an embodiment of the present disclosure, the capacitance of the second storage capacitor Cst2 may be greater than the capacitance of the first storage capacitor Cst1. For example, the ratio of the capacitance of the second storage capacitor Cst2 to the first storage capacitor Cst1 may be approximately 7:3. In order to form the capacitance of the second storage capacitor Cst2 to be greater than the capacitance of the first storage capacitor Cst1, the second capacitor electrode CE2 may have a greater area than the first capacitor electrode CE1.

The third and fourth capacitor electrodes CE3 and CE4 may face each other with respect to the first insulation layer GIL which is interposed between the third and fourth capacitor electrodes CE3 and CE4. Accordingly, the compensation capacitor Cgs may be defined by the third and fourth capacitor electrodes CE3 and CE4.

An overlapped area disposed between the output electrode DE and the control electrode GE may have a trade-off relationship between an overlapped area of the third and fourth capacitors CE3 and CE4. As illustrated in FIG. 5A, when an overlapped area W1 between the output electrode DE and the control electrode GE increases, an overlapped area W2 of the third and fourth capacitor electrodes CE3 and CE4 may decrease. On the other hand, when the overlapped area W1 between the output electrode DE and the control electrode GE decreases, the overlapped area W2 of the third and fourth capacitor electrodes CE3 and CE4 may increase. Accordingly, even if the overlapped area W1 between the output electrode DE and the control electrode GE varies from a desired value due to a process error and the like, the error is compensated through the compensation capacitor Cgs, so that it is possible to prevent a phenomenon in which a kickback voltage fluctuates.

The second substrate DS2 includes a second base substrate BS2 and a reference electrode RE. The second base substrate BS2 is disposed to face the first base substrate BS1. The second base substrate BS2 may be formed of a glass substrate, or a plastic substrate having light transmission properties and flexible properties.

On one surface of the second base substrate BS2, the reference electrode RE is provided. That is, the reference electrode RE is disposed between the first base substrate BS2 and the second base substrate BS2. The reference electrode RE may include a transparent electrode material. The reference electrode RE may be formed in the form of a single cylindrical electrode on one surface of the second base substrate BS2. The reference electrode RE faces the pixel electrode PE with respect to the liquid crystal layer LCL which is disposed between the reference electrode RE and the pixel electrode PE. A liquid crystal capacitor Clc may be defined by the reference electrode RE, the pixel electrode PE, and the liquid crystal layer LCL. The liquid crystal molecules included in the liquid crystal layer LCL may be aligned according to an electric field formed due to the difference in voltage between a data voltage applied to the pixel electrode PE and a first reference voltage Vcom (illustrated in FIG. 8) applied to the reference electrode RE. The display panel 100 may display an image having a desired gray scale by controlling the transmittance of light provided from the backlight unit 500 (illustrated in FIG. 1) according to the liquid crystal alignment of the liquid crystal molecules.

The reference electrode RE faces the shielding electrode LSE with respect to the liquid crystal layer which is disposed between the reference RE electrode RE and the shielding electrode LSE. The second reference voltage Scom (illustrated in FIG. 8) is applied to the shielding electrode LSE. The data voltage applied to the pixel electrode PE varies according to the gray scale of an image to be displayed in each pixel PXij, but the first and second reference voltages Vcom and Scom have a direct current (DC) voltage level. In an embodiment of the present disclosure, the second reference voltage Scom may have the same voltage level as the first reference voltage Vcom. For example, the first and second reference voltages Vcom and Scom may have a voltage level of about 6 V.

Accordingly, an electric field is not formed between the shielding electrode LSE and the reference electrode RE, and the liquid crystal molecules of the liquid crystal layer LCL disposed between the shielding electrode LSE and the reference electrode RE are not aligned. A non-alignment region is defined between the shielding electrode LSE and the reference electrode RE, and the light provided from the backlight unit 500 does not pass through the non-alignment region. Accordingly, the non-alignment region may be defined as a light blocking region which blocks the light provided from the backlight unit 500.

Although not illustrated in the drawings, a color filter layer may be provided to any one of the first and second substrates DS1 and DS2. The color filter layer may include red, green, and blue color filters. In an embodiment of the present disclosure, when the color filter layer is provided to the second substrate DS2, the color filter layer may be disposed between the second base substrate BS2 and the reference electrode RE.

In addition, a black matrix layer (not shown) may be formed in one of the first and second substrates DS1 and DS2. The black matrix layer may be formed of an organic material or a metal material having light-shielding properties. The black matrix layer may be provided not to overlap the shielding electrode LSE. The black matrix layer may block light leakage generated in a region in which no liquid crystal control power may reach.

Figure 6A:
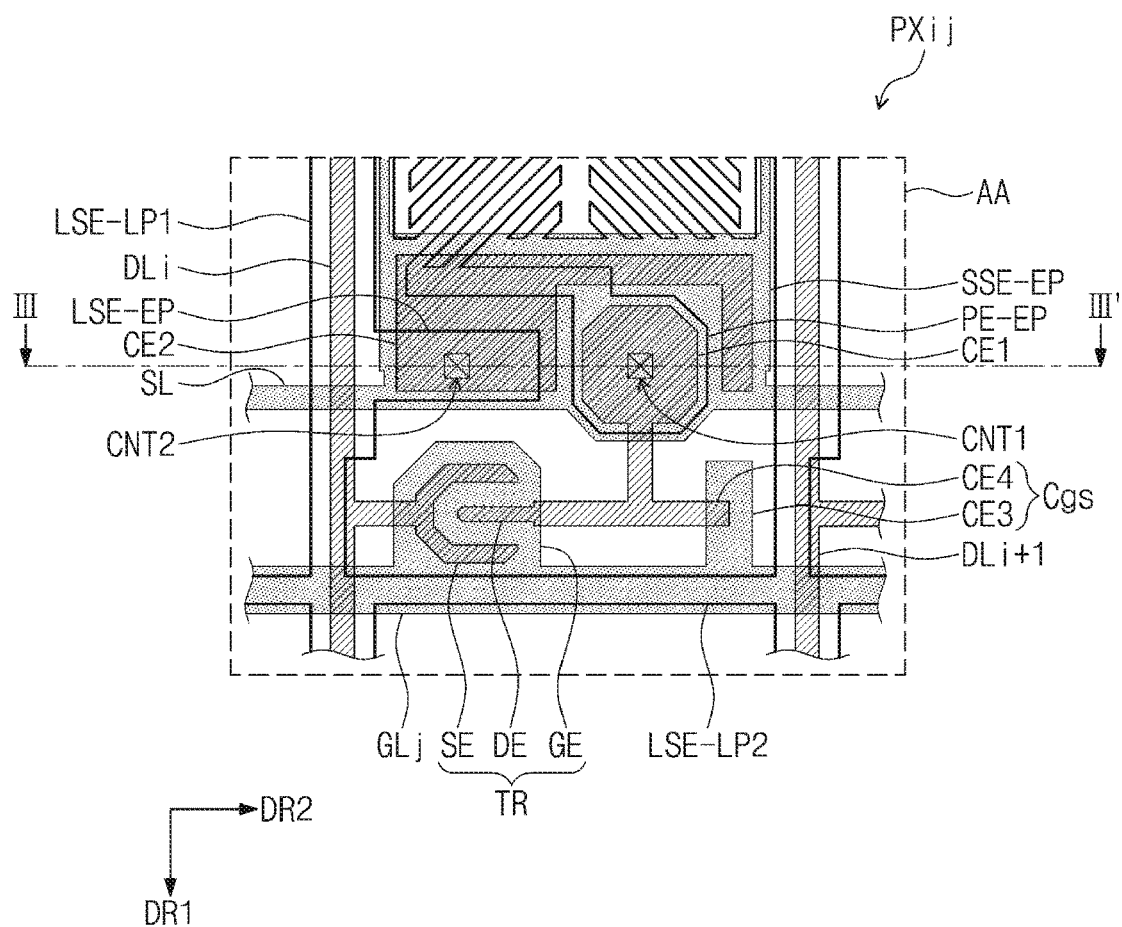
FIG. 6A is an enlarged view partially showing a layout of pixels according to an embodiment of the present disclosure.
Figure 6B:
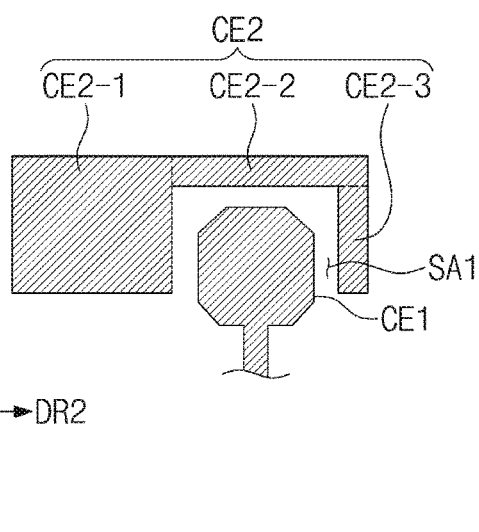
FIG. 6B is a plan view of first and second capacitor electrodes according to an embodiment of the present disclosure.
Figure 6C:
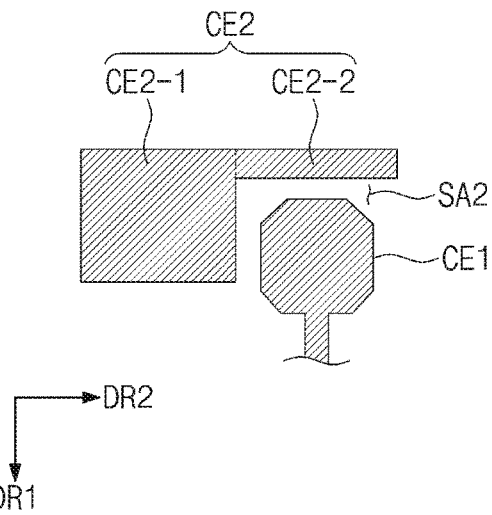
FIG. 6C is a plan view of first and second capacitor electrodes according to an embodiment of the present disclosure.
Figure 6D:
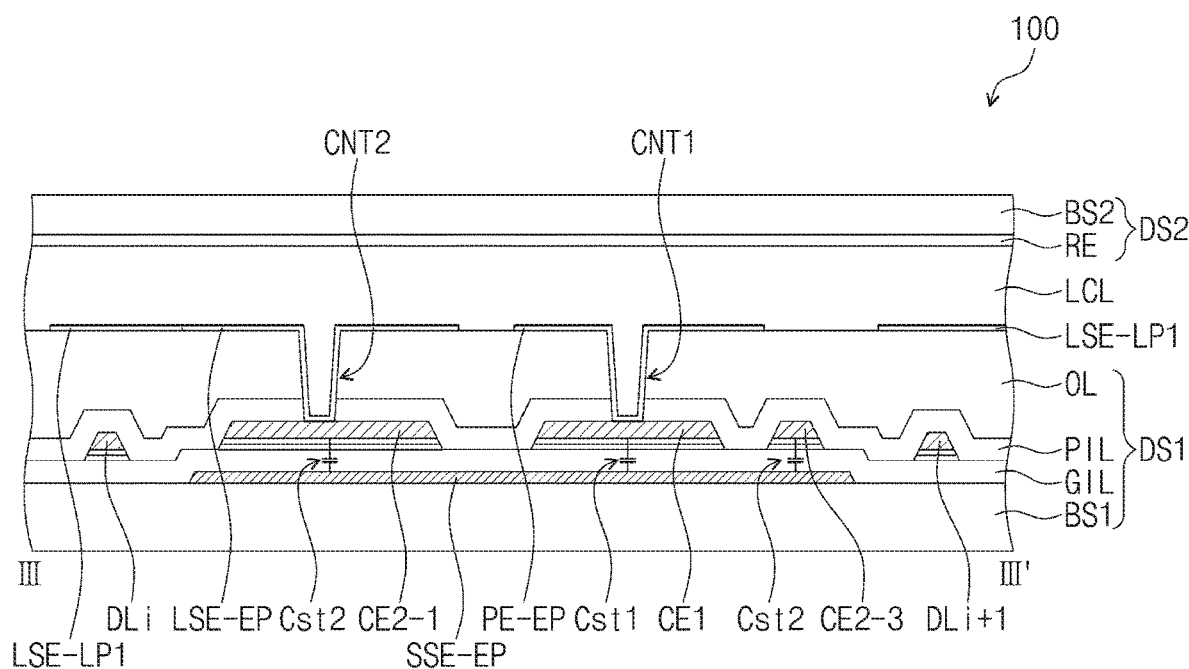
FIG. 6D is a cross-sectional view taken along line III-III' illustrated in FIG. 6A.

FIG. 6A is an enlarged view partially showing a layout of pixels according to an embodiment of the present disclosure, and FIG. 6B is a plan view of first and second capacitor electrodes according to an embodiment of the present disclosure. FIG. 6C is a plan view of first and second capacitor electrodes according to an embodiment of the present disclosure. FIG. 6D is a cross-sectional view taken along line III-III' illustrated in FIG. 6A.

Among the components illustrated in FIG. 6A and FIG. 6B, the same components as those illustrated in FIG. 4 and FIG. 5B are denoted by the same reference numerals, and detailed descriptions of the same reference numerals are omitted.

Referring to FIG. 6A and FIG. 6B, the pixel PXij according to an embodiment of the present disclosure has the same structure as the pixel PXij illustrated in FIG. 4 except that the second capacitor electrode CE2 has a different shape from the second capacitor electrode CE2 illustrated in FIG. 4.

The second capacitor electrode CE2 may include a first electrode portion CE2-1, a second electrode portion CE2-2, and a third electrode portion CE2-3. The first electrode portion CE2-1 has a quadrangular shape when viewed on a plan. The second electrode portion CE2-2 is extended in the second direction DR2 from one end of the first electrode portion CE2-1. The width of the second electrode portion CE2-2 in the first direction DR1 is smaller than the width of the first electrode portion CE2-1 in the first direction DR1. The third electrode portion CE2-3 is extended in the first direction DR1 from one end of the second electrode portion CE2-2. A separation space SA1 is formed between the first and the third electrode portions CE2-1 and CE2-3, and the first capacitor electrode CE1 may be disposed in the separation space SA1 formed between the first and the third electrode portions CE2-1 and CE2-3. Accordingly, the area of the second capacitor electrode CE2 may increase while efficiently utilizing a space within the pixel region.

As illustrated in FIG. 6C, the second capacitor electrode CE2 may include the first and second electrode portions CE2-1 and CE2-2. The first electrode portion CE2-1 has a quadrangular shape when viewed on a plan. The second electrode portion CE2-2 is extended in the second direction DR2 from one end of the first electrode portion CE2-1. The second capacitor electrode CE2 illustrated in FIG. 6C further includes the second electrode portion CE2-2 when compared to the second capacitor electrode CE2 illustrated in FIG. 4, and thus, may have a larger area than the second capacitor electrode CE2 illustrated in FIG. 4. Accordingly, the capacitance of the second storage capacitor Cst2 may increase in a given space.

The first capacitor electrode CE1 may be disposed in a space SA2 between the first and second electrode portions CE2-1 and CE2-2. Accordingly, the area of the second capacitor electrode CE2 may increase while efficiently utilizing a space within the pixel region.

Referring FIG. 6B and FIG. 6D, the first electrode portion CE2-1 overlaps the extension portion LSE-EP of the shielding electrode LSE and is in direct contact with the extension portion LSE-EP of the shielding electrode LSE through the second contact hole CNT2. The second capacitor electrode CE2 may receive the second reference voltage Scom (illustrated in FIG. 8) from the shielding electrode LSE through the first electrode portion CE2-1. The second and third electrode portions CE2-2 and CE2-3 do not overlap the extension portion LSE-EP of the shielding electrode LSE.

The first, second, and third electrode portions CE2-1, CE2-2, and CE2-3 of the second capacitor electrode CE2 are disposed not to overlap the electrode portion SSE-EP of the storage electrode SSE. At least a part of the second storage capacitor Cst2 is formed in a portion in which the first, second, and third electrode portions CE2-1, CE2-2, and CE2-3 overlap the electrode portion SSE-EP of the storage electrode SSE.

Figure 7:
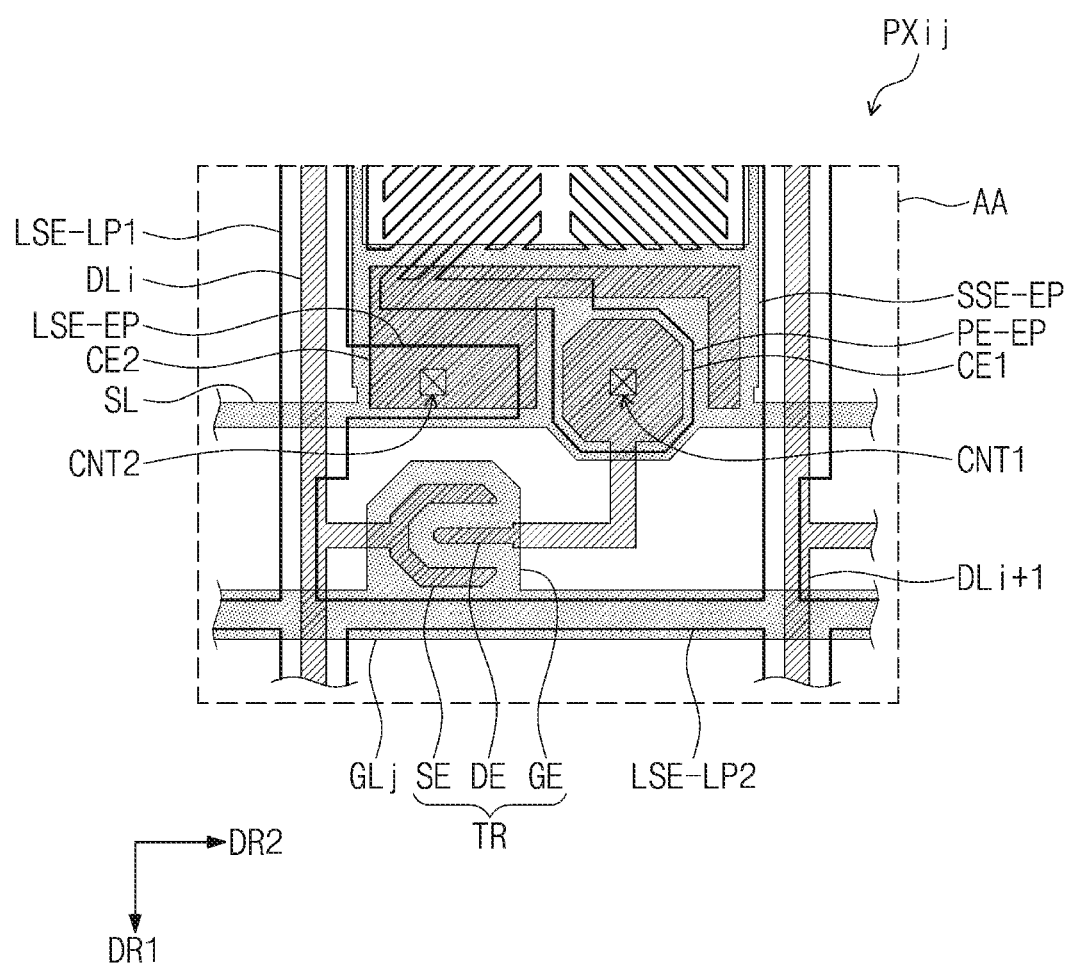
FIG. 7 is an enlarged view partially showing a layout of pixels according to an embodiment of the present disclosure.

FIG. 7 is an enlarged view partially showing a layout of pixels according to an embodiment of the present disclosure. Among the components illustrated in FIG. 7, the same components as those illustrated in FIG. 6A are denoted by the same reference numerals, and detailed descriptions thereof are omitted.

Referring to FIG. 7, the pixel PXij according to an embodiment of the present disclosure has the same structure as the pixel PXij illustrated in FIG. 6A except the compensation capacitor Cgs.

That is, the compensation capacitor Cgs defined by the third and fourth capacitor electrodes CE3 and CE4 may be omitted from the pixel PXij of FIG. 7. That is, when the pixel PXij according to an embodiment of the present disclosure does not include the compensation capacitor Cgs, the position, area, and the like of the first to second capacitor electrodes CE1 and CE2 in the pixel region may be adjusted.

Figure 8:
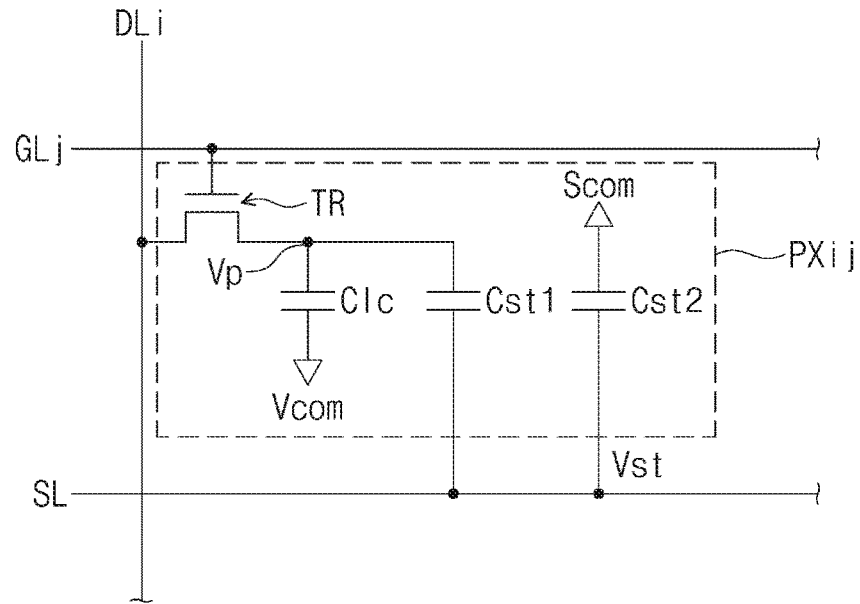
FIG. 8 is an equivalent circuit diagram of the pixels illustrated in FIG. 7.

FIG. 8 is an equivalent circuit diagram of the pixels illustrated in FIG. 7.

Referring to FIG. 7 and FIG. 8, the pixel PXij according to an embodiment of the present disclosure includes the switching element TR, the liquid crystal capacitor Clc connected to the output electrode DE of the switching element TR, the first storage capacitor Cst1 connected to the liquid crystal capacitor Clc, and the second storage capacitor Cst2 connected to the first storage capacitor Cst1.

The liquid crystal capacitor Clc includes the pixel electrode PE connected to the output electrode DE of the switching element TR as a first electrode and the reference electrode RE (illustrated in FIG. 6D) for receiving the first reference voltage Vcom as a second electrode.

The first storage capacitor Cst1 includes the storage electrode SSE for receiving a storage voltage Vst through the storage line SL as a first electrode and the first capacitor electrode CE1 connected to the output electrode DE of the switching element TR as a second electrode. In an embodiment of the present disclosure, the storage voltage Vst may have a higher voltage level than the first reference voltage Vcom. For example, when the first reference voltage Vcom is about 6 V, the storage voltage Vst may be about 7.5 V.

The second storage capacitor Cst2 includes the storage electrode SSE for receiving the storage voltage Vst through the storage line SL as a first electrode and the second capacitor electrode CE2 for receiving the second reference voltage Scom through the shielding electrode LSE as a second electrode. In an embodiment of the present disclosure, the second reference voltage Scom may have the same voltage level as the first reference voltage Vcom. In addition, the second reference voltage Scom may have a different voltage level from the storage voltage Vst.

The capacitance of the first storage capacitor Cst1 may be different from the capacitance of the second storage capacitor Cst2. In an embodiment of the present disclosure, the capacitance of the second storage capacitor Cst2 may be greater than the capacitance of the first storage capacitor Cst1. For example, the ratio of the capacitance of the first and second storage capacitors Cst1 and Cst2 may be about 3:7.

Figure 9:
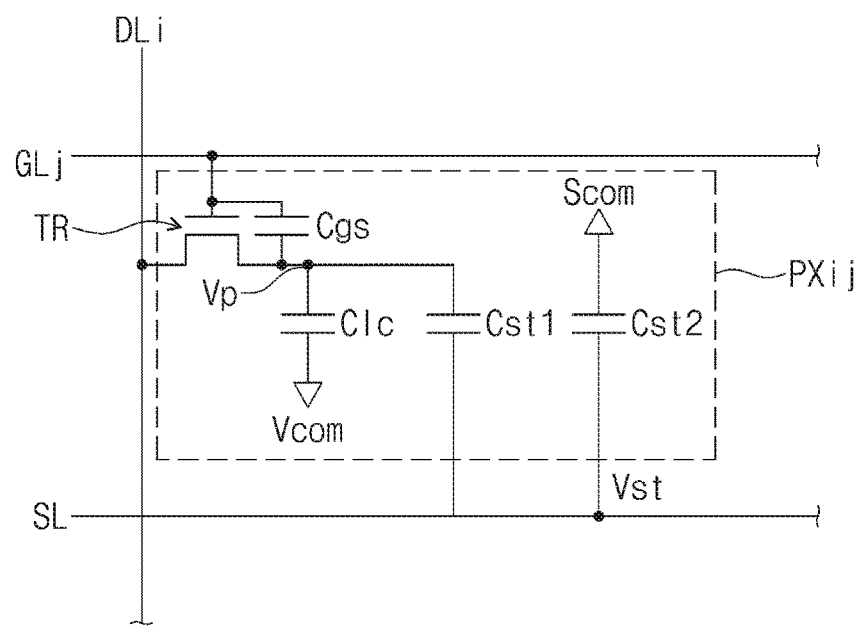
FIG. 9 is an equivalent circuit diagram of the pixels illustrated in FIG. 6A.

FIG. 9 is an equivalent circuit diagram of the pixels illustrated in FIG. 6A.

Referring to FIG. 6A and FIG. 9, the pixel PXij according to an embodiment of the present disclosure may further include a compensation capacitor Cgs connected between the control electrode GE and the output electrode DE of the switching element TR.

A parasitic capacitance between the output electrode DE and the control electrode GE of the switching element TR may vary depending on the position of the pixels PX due to a process error between the pixels PX in the display panel 100. The compensation capacitor Cgs may compensate for the deviation of the parasitic capacitance. That is, the compensation capacitor Cgs is designed such that when the parasitic capacitance decreases, the capacitance of the compensation capacitor Cgs increases, and when the parasitic capacitance increases, the capacitance of the compensation capacitor Cgs decreases, so that the variation of the parasitic capacitance may be offset by the compensation capacitor Cgs. Accordingly, the difference in kickback voltage among the pixels may be compensated by the compensation capacitor Cgs.

Figure 10A:
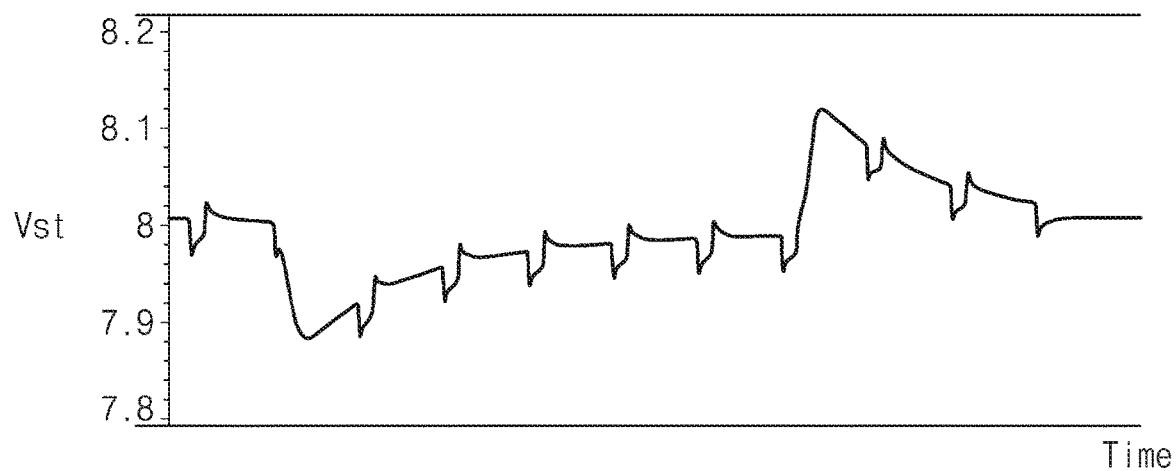
FIG. 10A is a waveform diagram showing a storage voltage illustrated in FIG. 9.
Figure 10B:
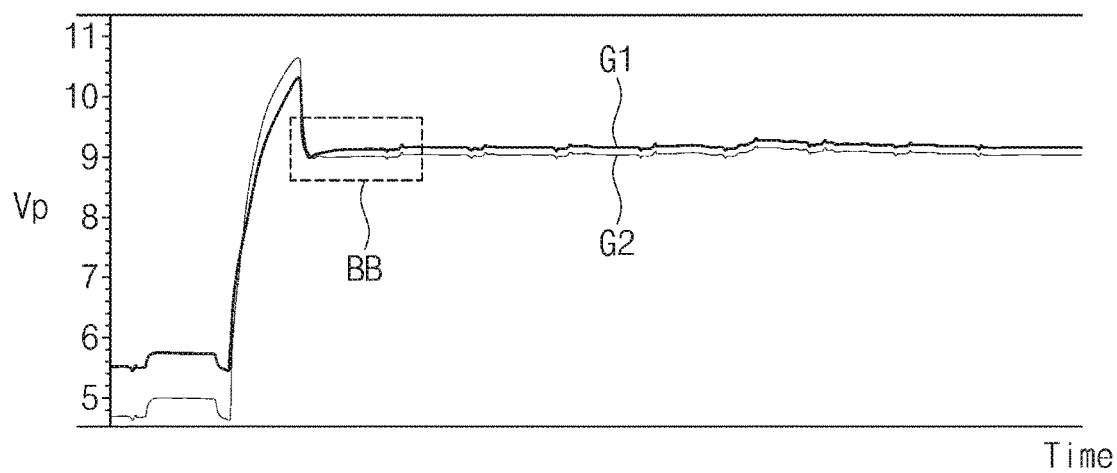
FIG. 10B is a waveform diagram showing a pixel voltage charged to a liquid crystal capacitor of FIG. 9.
Figure 10C:
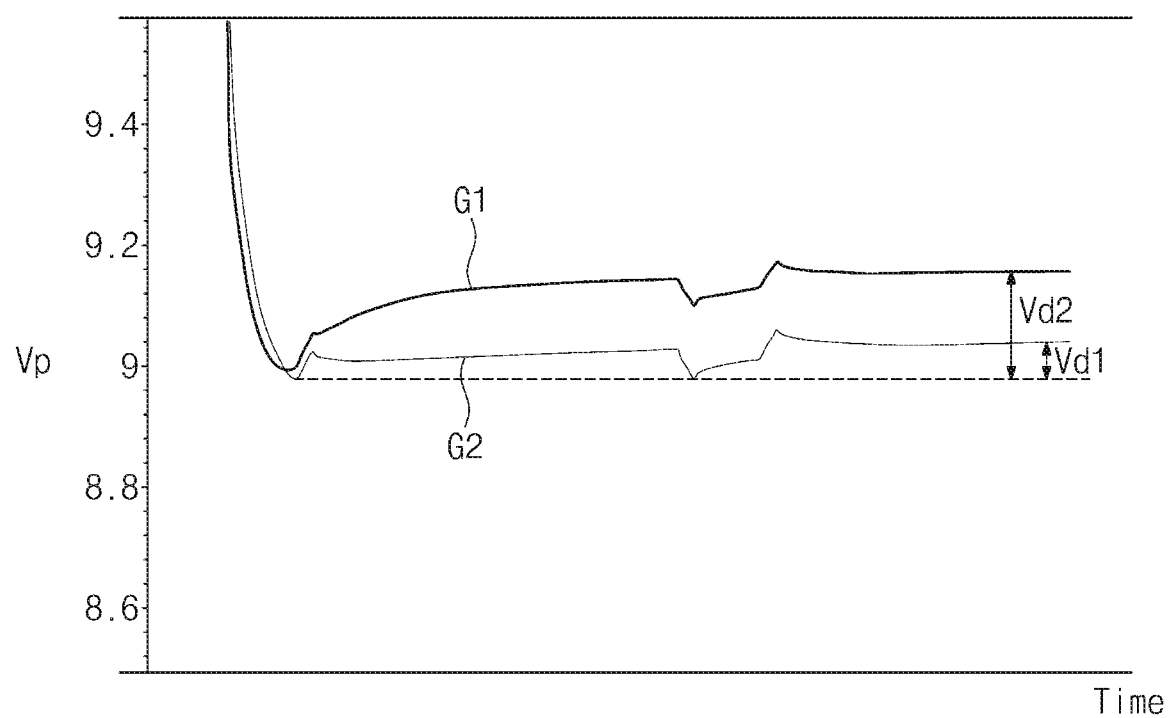
FIG. 10C is a waveform diagram showing an enlarged BB region of FIG. 10B.

FIG. 10A is a waveform diagram showing a storage voltage illustrated in FIG. 9, and FIG. 10B is a waveform diagram showing a pixel voltage charged to a liquid crystal capacitor of FIG. 9. FIG. 10C is a waveform diagram showing an enlarged BB region of FIG. 10B. In FIG. 10B and FIG. 10C, a first graph G1 represents a pixel voltage in a pixel not including the second storage capacitor Cst2, and a second graph G2 represents a pixel voltage in the pixel PXij including the second storage capacitor Cst2.

Referring to FIGS. 8, 9, 10A, 10B, and FIG. 10C, the storage line SL to which the storage voltage Vst is applied crosses the data line DLi, but does not cross the gate line GLi. Accordingly, a data voltage periodically applied to the data line DLi may cause a ripple in the storage voltage Vst. If the data voltage has a higher positive electrode voltage level than the first reference voltage Vcom, a rising ripple may be generated in the storage voltage Vst, and if the data voltage has a lower negative electrode voltage level than the first reference voltage Vcom, a falling ripple may be generated in the storage voltage Vst.

The storage line SL is connected to a pixel through the first and second storage capacitors Cst1 and Cst2. Particularly, a ripple generated in the storage voltage Vst may be reflected on a pixel voltage Vp by the first storage capacitor Cst1 connected to the pixel electrode PE. That is, a ripple may be generated in the pixel voltage Vp in response to the ripple generated in the storage voltage Vst. However, depending on the size of the capacitance of the first storage capacitor Cst1 connected to the pixel electrode PE, the effect of the ripple generated in the storage voltage Vst on the pixel voltage Vp may vary. That is, as the capacitance of the first storage capacitor Cst1 decreases, the effect of the ripple generated in the storage voltage Vst on the pixel voltage Vp is reduced.

As illustrated in FIG. 10C, when the storage electrode SSE (illustrated in FIG. 6A and FIG. 7) is all utilized as the first storage capacitor Cst1, as shown in the first graph G1, the fluctuation range of the pixel voltage Vp caused by the ripple generated in the storage voltage Vst increases by a first value Vd1.

However, when a portion of the storage electrode SSE is utilized as the first storage capacitor Cst1 and the remaining portion is utilized as the second storage capacitor Cst2, as shown in the second graph G2, the fluctuation range of the pixel voltage Vp caused by the ripple generated in the storage voltage Vst decreases by a second value Vd2. The fluctuation of the pixel voltage Vp may be represented by difference in luminance by position on a screen of the display apparatus 1000 (refer to FIG. 1), and in particular, may lead to a horizontal cross-talk phenomenon in which horizontal stripe patterns are viewed on the screen. As such, when the fluctuation range of the pixel voltage Vp is reduced, the horizontal cross-talk phenomenon may be suppressed, and as a result, the display quality may be improved.

The pixel PXij includes the second storage capacitor Cst2. The first and second storage capacitors Cst1 and Cst2 serve to maintain the pixel voltage Vp charged in the pixel PXij constant. As mentioned above, if the capacitance of the first storage capacitor Cst1 decreases, the maintenance performance of the pixel voltage Vp may be deteriorated. In order to overcome the above problem, the pixel PXij further includes the second storage capacitor Cst2. The second storage capacitor Cst2 serves to maintain the pixel voltage Vp, but is not directly connected to the pixel electrode PE, and therefore, even if the capacitance of the second storage capacitor Cst2 increases, a ripple of the storage voltage Vst is not reflected on the pixel voltage Vp.

When the operation mode of the display panel 100 (illustrated in FIG. 1) is switched from a low frequency mode to a high frequency mode or switched from a high frequency mode to a low frequency mode, the charging time of the pixel PXij is decreased or increased. Due to the difference in charging time, the pixel voltage Vp charged in the pixel PXij may not be maintained constant so that a shaking phenomenon and the like may occur on the screen. In this case, the second storage capacitor Cst2 may allow the pixel voltage Vp charged in the pixel PXij to be maintained constant even when a frequency fluctuates.

As such, since the first and second storage capacitors Cst1 and Cst2 are separately provided in the pixel PXij, the overall display quality of the display panel 100 may be improved.

In a display apparatus according to an embodiment of the present disclosure, a portion of a storage electrode is utilized as a first storage capacitor and the remaining portion is utilized as a second storage capacitor in a pixel so that it is possible to prevent the deterioration in maintenance performance of a pixel voltage while suppressing a problem in which a ripple of a storage voltage is reflected in the pixel voltage. Therefore, the overall display quality of a display apparatus may be improved.

Although the present disclosure has been described with reference to a preferred embodiment of the present disclosure, it will be understood by those skilled in the art that various changes in form and details may be made therein without departing from the spirit and scope of the present disclosure.

Accordingly, the technical scope of the present disclosure is not intended to be limited to the contents set forth in the detailed description of the specification, but is intended to be defined by the appended claims.

What is claimed is:

1. A display apparatus comprising:
   a first substrate including a plurality of pixels;
   a second substrate facing the first substrate; and
   a liquid crystal layer disposed between the first substrate and the second substrate,
   wherein the first substrate includes:
      a plurality of gate lines;
      a plurality of data lines insulated from the gate lines;
      a storage electrode insulated from the gate line and the data line respectively;
      a switching element electrically connected to the data lines and the gate lines;
      a pixel electrode electrically connected to an output electrode of the switching element;
      a shielding electrode insulated from the pixel electrode and including a line portion disposed in aligned with the data lines and an extension portion extended from the line portion;
      a first capacitor electrode extended from the output electrode and overlapping the pixel electrode and the storage electrode; and
      a second capacitor electrode disposed spaced apart from the first capacitor electrode and overlapping the extension portion of the shielding electrode and the storage electrode,
   wherein the shielding electrode is in direct contact with the second capacitor electrode and the shielding electrode isn't in direct contact with the first capacitor electrode, and
   the shielding electrode and the storage electrode receive different voltages from each other.

2. The display apparatus of claim 1, wherein the second capacitor electrode is in direct contact with the extension portion of the shielding electrode.

3. The display apparatus of claim 1, wherein the first capacitor electrode is in direct contact with the pixel electrode.

4. The display apparatus of claim 1, wherein an area of the second capacitor electrode is greater than an area of the first capacitor electrode.

5. The display apparatus of claim 1, wherein the first substrate further includes:
   a first insulation layer disposed on the gate line and the storage electrode and having the output electrode, the data line, and the first and second capacitor electrodes disposed on the gate line and the storage electrode; and
   a second insulation layer disposed on the output electrode, the data line, and the first and second capacitor electrodes and having the pixel electrode and the shielding electrode disposed on the output electrode, the data line, and the first and second capacitor electrodes.

6. The display apparatus of claim 5, wherein the second insulation layer includes a first contact hole configured to expose the first capacitor electrode and a second contact hole configured to expose the second capacitor electrode,
   the pixel electrode is in direct contact with the first capacitor electrode through the first contact hole, and
   the extension portion of the shielding electrode is in direct contact with the second capacitor electrode through the second contact hole.

7. The display apparatus of claim 1, wherein the second substrate includes a reference electrode to which a first reference voltage is applied, and a second reference voltage is applied to the shielding electrode.

8. The display apparatus of claim 7, wherein a storage voltage is applied to the storage electrode, and the first and second reference voltages have a different voltage level from the storage voltage.

9. The display apparatus of claim 8, wherein the first and second reference voltages have equal voltage level.

10. The display apparatus of claim 1, wherein the first substrate further includes a storage line insulated from the gate line and the data line respectively, and the storage line is electrically connected to the storage electrode.

11. The display apparatus of claim 10, wherein the storage line crosses the data line and does not cross the gate line.

12. The display apparatus of claim 1, wherein the pixel electrode includes:
a stem portion for dividing a pixel region into a plurality of domains; and
a plurality of branch portions extended from the stem portion.

13. The display apparatus of claim 12, wherein the stem portion comprises:
a horizontal stem portion; and
a vertical stem portion intersecting the horizontal stem portion,
wherein the plurality of branch portions are extended radially from the horizontal stem portion and the vertical stem portion.

14. A display apparatus comprising:
a plurality of gate lines;
a plurality of data lines insulated from the gate lines;
a plurality of storage lines insulated from the gate lines and the data lines respectively; and
a plurality of pixels, each pixel electrically connected to the gate lines, the data lines, and at least one storage line,
wherein the pixel includes:
a switching element electrically connected to the gate line and the data line;
a liquid crystal capacitor electrically connected to an output electrode of the switching element;
a first storage capacitor including a storage electrode and a first capacitor electrode, and electrically connected to the liquid crystal capacitor and the storage line; and
a second storage capacitor including a second capacitor electrode, and electrically connected to the storage line and a shielding electrode,
wherein the shielding electrode is in direct contact with the second capacitor electrode and the shielding electrode isn't in direct contact with the first capacitor electrode, and
the shielding electrode and the storage electrode receive different voltages from each other.

15. The display apparatus of claim 14, wherein the liquid crystal capacitor includes a pixel electrode electrically connected to the output electrode of the switching element as a first electrode and a reference electrode facing the pixel electrode as a second electrode.

16. The display apparatus of claim 15, wherein the first storage capacitor includes the storage electrode connected to the storage line as a first electrode and the first capacitor electrode overlapping the storage electrode and extended from the output electrode as a second electrode.

17. The display apparatus of claim 16, wherein the second storage capacitor includes the storage electrode as a first electrode and the second capacitor electrode overlapping the storage electrode as a second electrode.

18. The display apparatus of claim 17, wherein the storage electrode receives a storage voltage through the storage line, the reference electrode receives a first reference voltage having a different voltage level from the storage voltage, and the shielding electrode receives a second reference voltage having a different voltage level from the storage voltage.

19. The display apparatus of claim 18, wherein the first and second reference voltages have equal voltage level.

20. The display apparatus of claim 14, wherein a capacitance of the second storage capacitor is greater than a capacitance of the first storage capacitor.

* * * * *